No. 672,717.  
H. SEMPLE.  
METHOD OF BLOWING NECKED GLASS ARTICLES.  
(Application filed Sept. 25, 1900.)  
(No Model.)  
Patented Apr. 23, 1901.  
5 Sheets—Sheet 1.
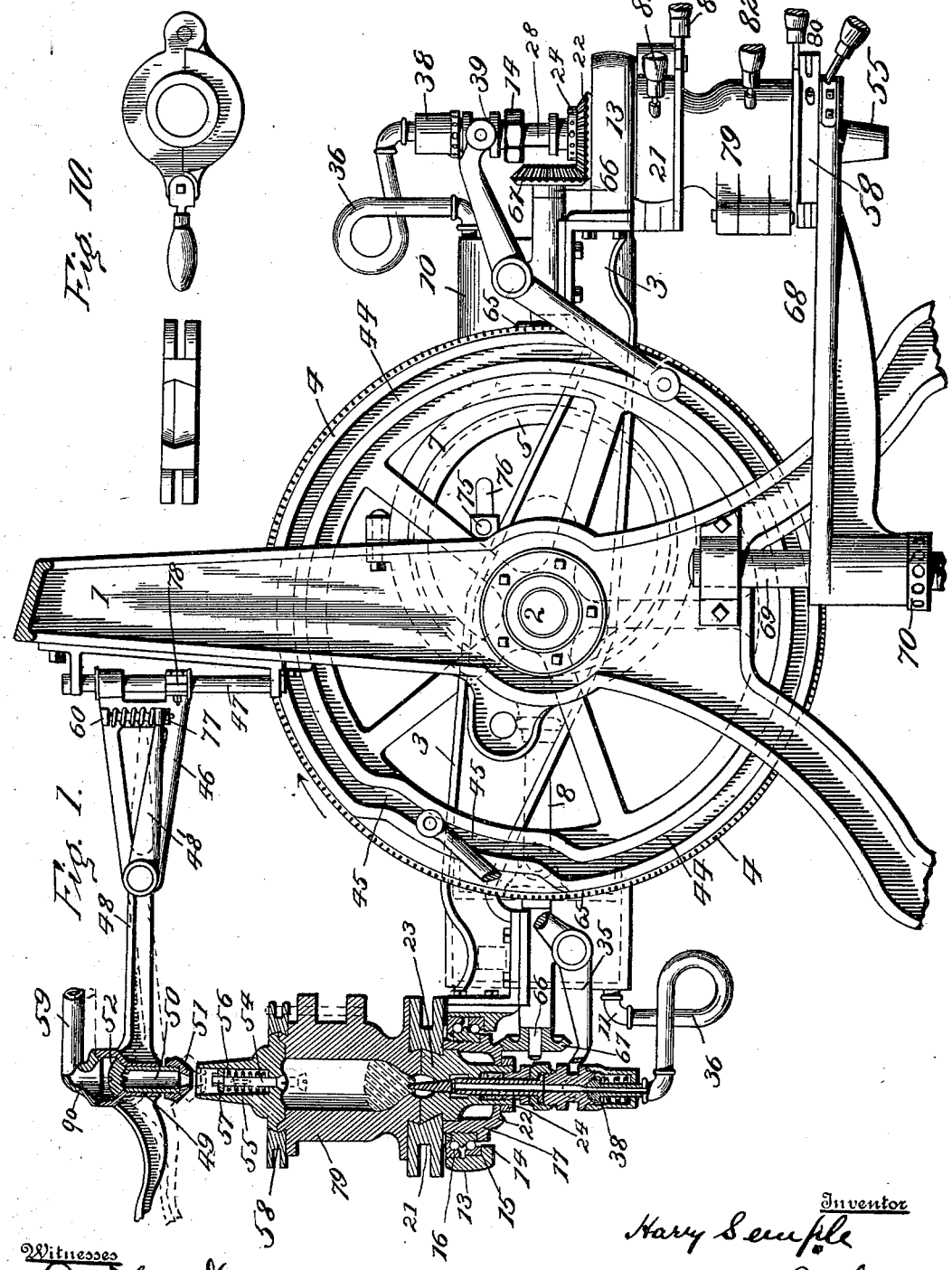
Witnesses  
Inventor  
Harry Semple  
by Johnson & Johnson  
Attorneys No. 672,717. Patented Apr. 23, 1901.
H. SEMPLE.
METHOD OF BLOWING NECKED GLASS ARTICLES.
(Application filed Sept. 25, 1900.)
(No Model.) 5 Sheets—Sheet 2.
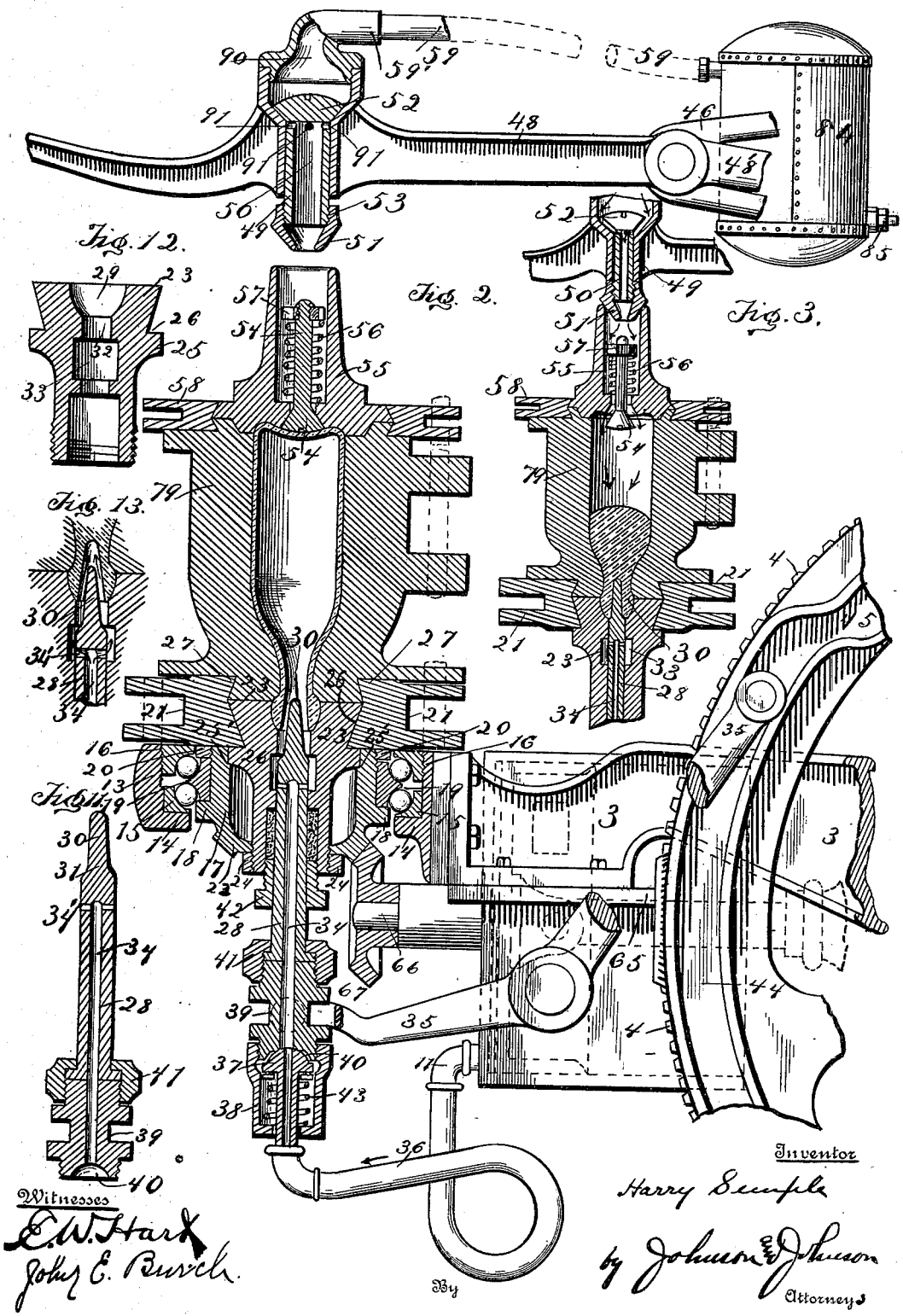

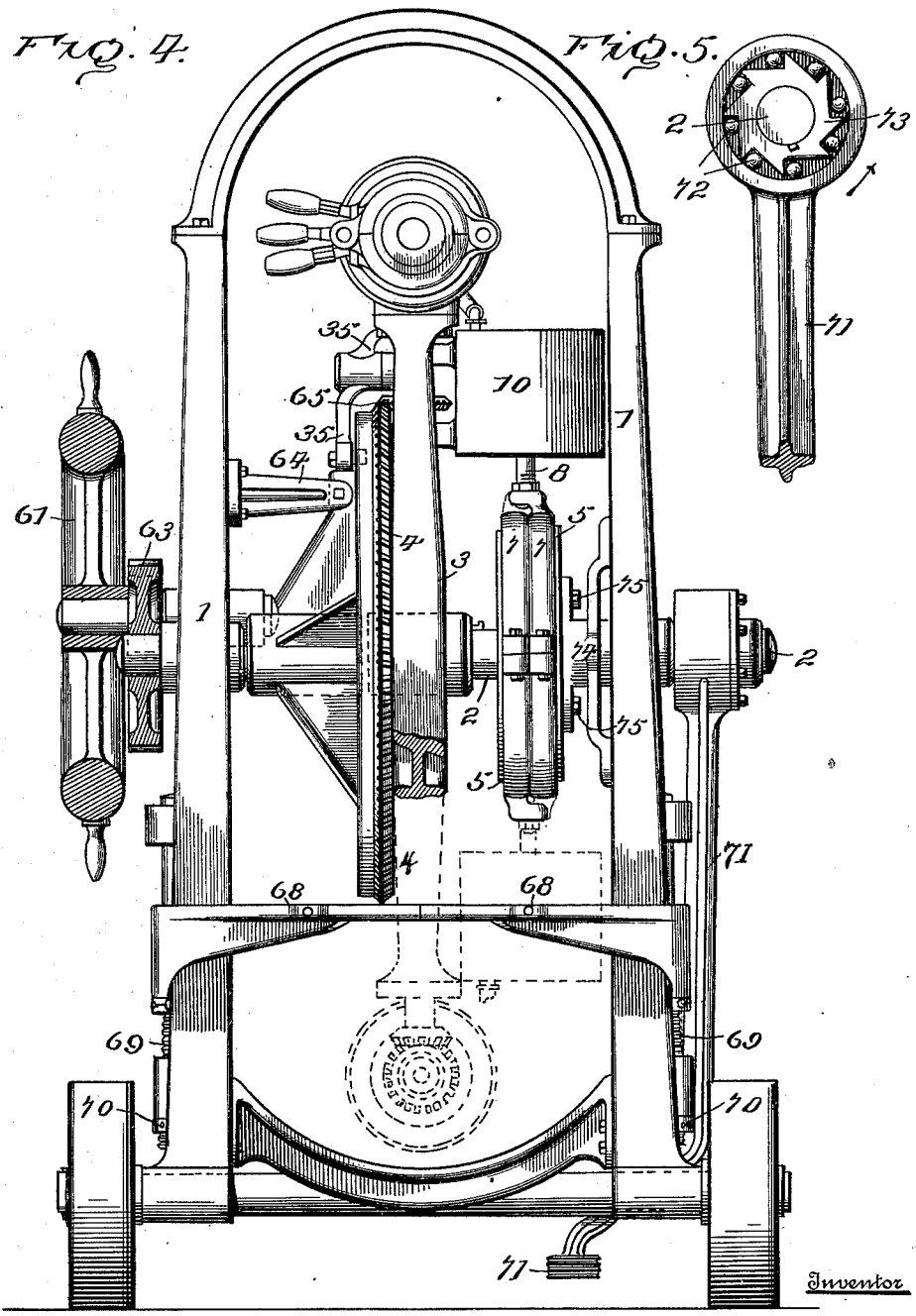

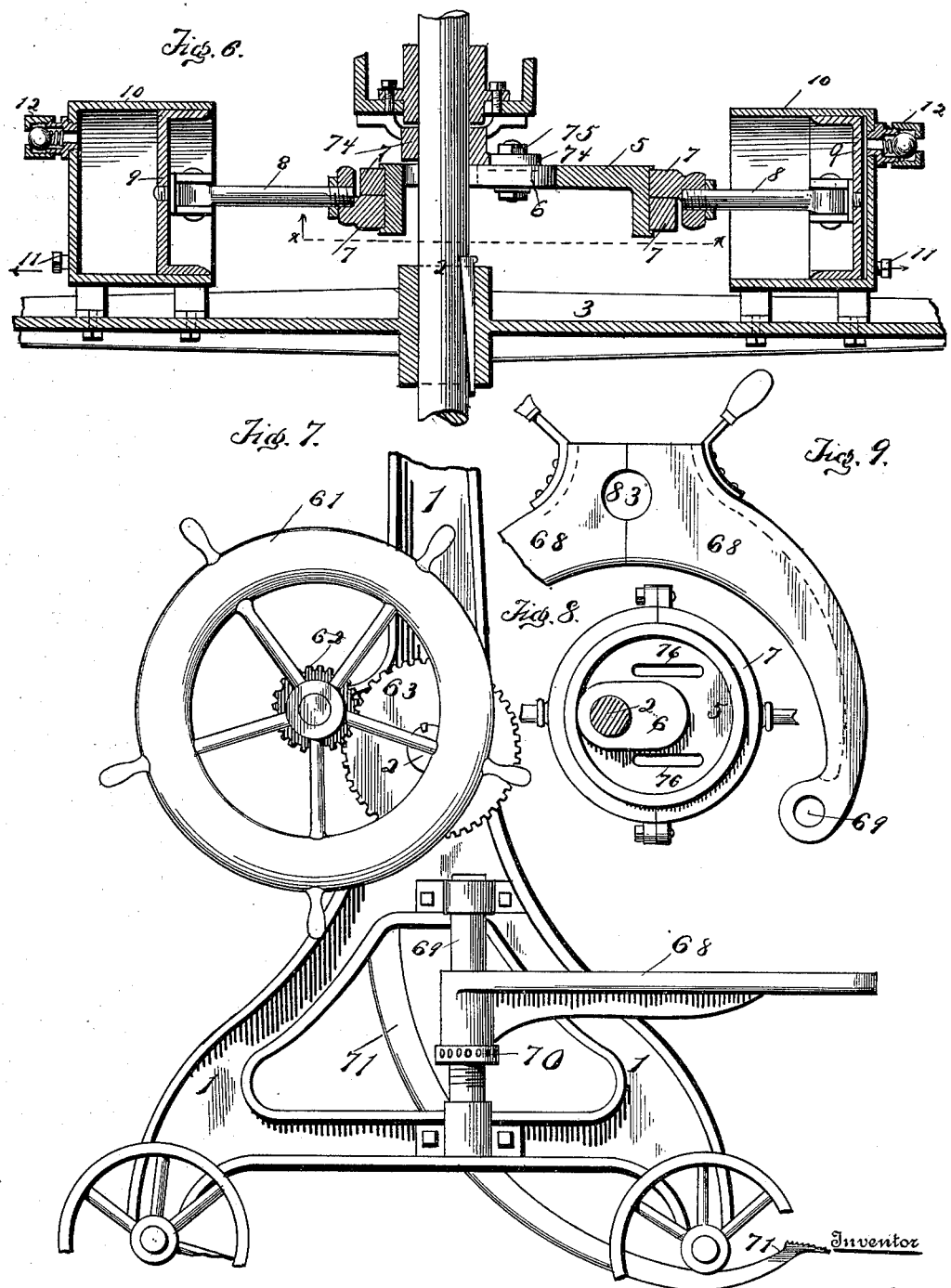

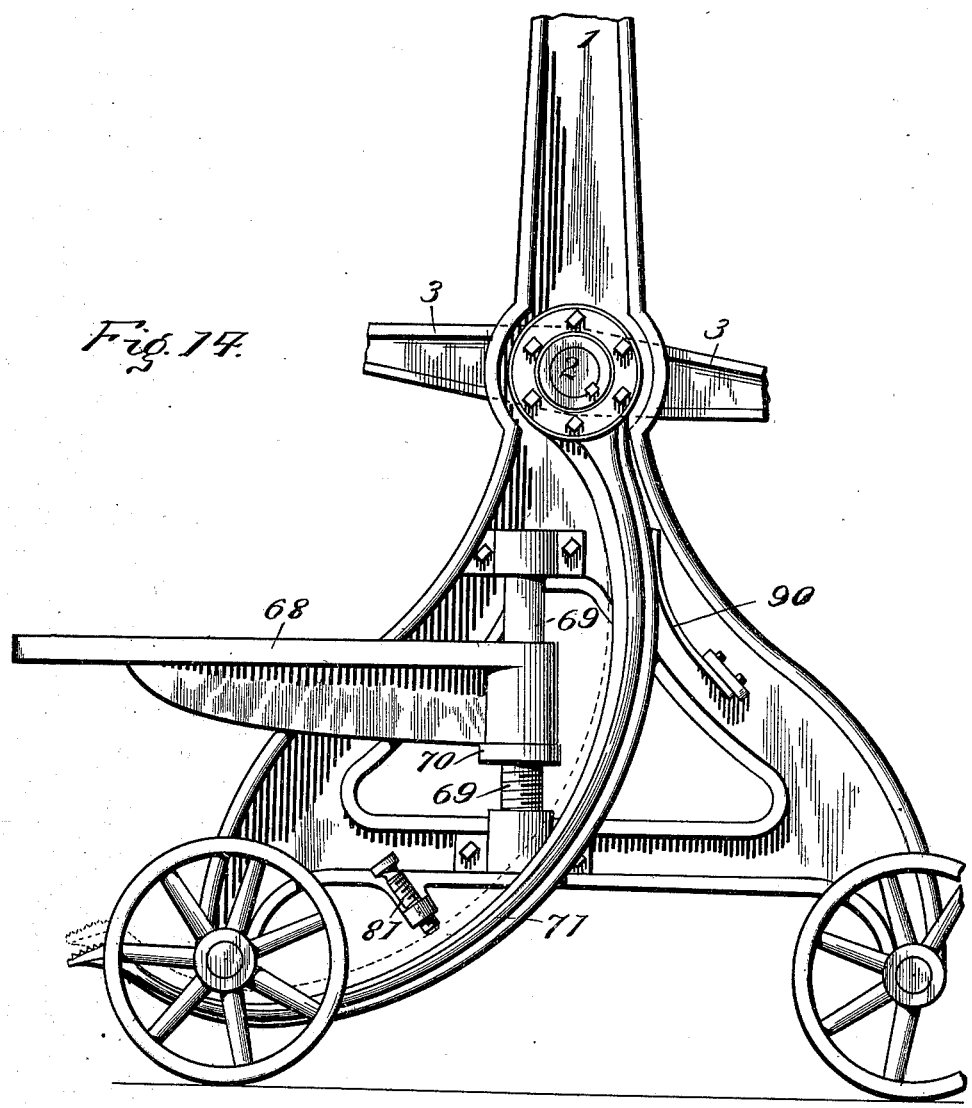

UNITED STATES PATENT OFFICE.

HARRY SEMPLE, OF WILMINGTON, DELAWARE.

METHOD OF BLOWING NECKED GLASS ARTICLES.

SPECIFICATION forming part of Letters Patent No. 672,717, dated April 23, 1901.

Application filed September 26, 1900. Serial No. 31,071. (No model.)

*To all whom it may concern:*

Be it known that I, HARRY SEMPLE, a citizen of the United States, residing at Wilmington, in the county of Newcastle and State of Delaware, have invented certain new and useful Improvements in Methods of Blowing Necked Glass Articles, of which the following is a specification.

In the statement of my invention in the method of blowing glassware the following description, read in connection with the accompanying drawings, will enable any one skilled in the art to which my invention relates to understand its nature and to practice it; but it will be understood that the means embodied in the illustrations is one form only of an organized machine by which my new method of blowing glassware may be carried out.

As shown, the machine is organized for blowing bottles; but obviously the method may be employed for blowing other glassware.

Referring to the drawings, Figure 1 represents the machine with its rotating mold-carrying beam in side view, one of the molds, the mechanism for rotating it axially, and the blow-valves at each end of the mold being shown in section in their normal closed positions, the tiller-wheel and gearing for rotating the mold-carrying beam being removed. Fig. 2 is an enlarged sectional view of the mold and its axially-rotating and blowing connections, the coacting valves for blowing by a sudden air-bolt the neck of the bottle through the bottom of the mold being in their closed or inoperative relation to the mold and to the high-air-pressure source and the plunger-valve in its open position in the neck of the bottle, which is seen as having been blown and expanded within the mold, and it will be understood that in being so blown the mold will be swung over through a half-circle to an upright position on the table, as seen in elevation in Fig. 1. Fig. 3 shows in section the mold, the coacting valves in operative or open positions to deliver suddenly into the mold air under high pressure from the neck, which is seen as having been blown in the charge, and the plunger-valve in its closed relation to the neck of the mold and in position to form the blow-hole of the charge preparatory to uncovering the blow-hole to the air, such uncovering being affected by the positive movement of the plunger-valve, as seen in Fig. 13. Fig. 4 is an end elevation of the machine looking from the right of Fig. 1, showing the rotating mold-carrying beam in vertical position, one of the air-compressors removed, and the independent eccentric-strap connections for the pistons of both compressors. Fig. 5 shows the treadle-clutch lever for effecting the release of the mold from the beam to permit the removal of the blown bottle in a way I shall hereinafter describe. Fig. 6 shows in section the rotating mold-carrying beam, the air-compressors thereon, and the eccentric, which by the rotation of the beam the piston of one compressor is seen at the limit of its air compressing and displacing stroke and the piston of the other compressor at the limit of its air-suction stroke. Fig. 7 is a side view showing the tiller-wheel and its gear connection with the shaft 2 on which the mold-beam is fixed. Fig. 8 shows the eccentric and its relation free of the shaft 2, taken on the line $x\,x$ of Fig. 6. Fig. 9 shows in top view the pivotally-mounted swing-tables, which form a rest and a stop in the operation of arresting the beam to remove the mold having the blown bottle and supporting the beam while blowing the neck of a bottle in the other mold. Fig. 10, Sheet 1, shows the usual split-clamp ring used for the split mold. Fig. 11, Sheet 2, shows the plug-valve with its solid blow-hole-forming point; and Fig. 12 shows the tubular mold-seating plug with its neck-forming cavity and valve-spaces with which the plunger-valve coacts. Fig. 13 shows the neck blow-hole uncovered; and Fig. 14 shows treadle, its stop, and spring for holding it in its normal position.

The frame in which the operating parts are mounted is preferably carried on wheels to render the machine portable and is composed of side standards 1 1, connected at their upper and lower ends. About mediately of their height and in suitable bearings in the standards is mounted to rotate a horizontal shaft 2, which carries the operating parts. On this shaft, about mediately of its length, is fixed a beam 3, mediately of its length, and has suitable provision whereby the mold parts and blowing devices are mounted and operated at each end of the beam. To the standard, at one side of the beam, is fixed a master bevel-gear 4, Fig. 4, so that the shaft and the beam must rotate together and independent of the master-gear. On the other side of the beam an eccentric 5 is suitably fixed on the other standard, so that the shaft passes through a slot 6 in the eccentric; but the latter has no connection with the shaft, as seen in Figs. 6 and 8. Suitably fitted to rotate on this fixed eccentric are two straps 7 7, Fig. 6, side by side, each pivotally connected by a rod 8 to a piston 9. Mounted on the beam at its side, at or near its end, is a trunk-cylinder 10 and within which the pistons are respectively fitted. The piston-rods are of equal length and their relation to the fixed eccentric is such that the rotation of the beam will give equal strokes to the pistons by reason of the fixed relation of the eccentric to the shaft. This fixed relation of the eccentric and the shaft is such that the eccentric projection is centrally in line with the piston-rods, which therefore are caused to reciprocate as their separate straps are rotated on the fixed eccentric.

Each cylinder has an air-outlet 11, which connects with the mold and an air-inlet valve 12, so that the beam, which carries a mold at each end, carries also an air-compressor at each end. The preferred arrangement is that the molds shall be on the ends of the beam and the compressors at the side thereof, so as to form a compact relation of the beam, its molds, the compressors, and their operating-eccentric. A convenient construction for mounting the molds on the ends of the beam and providing effective means for imparting to them an axial rotation, while at the same time they are rotated with the beam, is best seen in Fig. 2, wherein ball-bearings are provided for the axial rotation of the molds. At its ends the beam terminates in a ring 13, the axis of which is central with the molds and which is preferably bolted to the flanged end of the beam, so that the axis of the ring stands at right angles to the line of the beam. At one of its open sides the ring has an inward-projecting rim or flange 14, upon which is fitted in the angle against the inner wall of the ring a concave ring-seat 15. At its other open side the beam-ring has an interior-wall screw-thread to receive a concave ring-seat 16, Fig. 2, the concave sides of the ring-seats being opposite and contiguous, and each forms a raceway-bearing for a train of balls, upon which the base-section of the mold is mounted to rotate. This base mold-section consists of a cup-shaped casting 17, having at one end an external rim or flange 18, matching the internal rim 14, on which a ring 19 is fitted against the outer wall of the said cup, and is formed with concave seats matching those of the beam-ring and completing raceways for the ball-bearings on the beam-ring and the cup. A ring-screw 20, engaging the wall of the cup, retains the double concave ring-seat 19 in place upon the flange 18, and the ball-seating parts and the cup present a level face-support and seating for a base split-clamp lock 21, whereby the mold is caused to rotate upon the beam-ring. The lower edge of the cup has a cog-gear 22, and centrally within this cup is fitted a tubular plug 23, which projects beyond the cup and forms a lock-seating for the mold and for the clamp 21. The other end of the cup has a ring-screw 24, which, engaging the outer projecting end of the cup, binds the tubular plug by its circumferential shoulder 25, Fig. 12, upon an annular shoulder-seat 25' on the inner wall of the cup, Fig. 2. At its mold-seating end the tubular plug has an oblique circumferential undercut 26, which forms an annular shoulder on a plane with the end of the cup to receive the split clamp 21, which has a corresponding oblique part engaging a circumferential undercut 27, formed at the base of the mold, whereby the mold is clamped to and upon the flat end of the tubular plug, Fig. 2. Within the tubular plug is fitted a tubular stem 28, Fig. 11, which forms a passage for air in blowing the bottle and is slidable to open and close such air-passage, a plug-valve 31 operating at the mold-seating of the tubular stem for controlling the inlet of the air for blowing the bottle and also forms the initial blow-hole in the charge by a solid point 30. The tubular plug has an annular cavity 29 in its mold-seating end, Fig. 12, and the mold-chamber is contracted at its seating end, which forms a continuation of the plug-cavity 29, within which the neck of the bottle is blown. Within this cavity the tubular stem-valve terminates in the solid point 30, having a length sufficient to pierce the neck formed on the charge and form a hole therein about an inch, more or less, as in Fig. 3. The hole is preferably made flaring to the mouth of the bottle, so that when the plunger air-tube is withdrawn the hole will be uncovered around the solid point for the passage of the air from the tubular valve into the hole in the neck in the operation of blowing the bottle. At the base of the point 30 the stem 28 forms the valve 31, which reciprocates in an annular seat-opening 32, Fig. 12, joining the neck-forming cavity 29 of the mold-seating plug, so that when the stem-point is projected into the neck of the charge, as in Fig. 3, the valve will close the cavity 29 at the mouth of the neck, and thereby cut off the air-passage thereto while the neck and the blow-hole are being formed in the charge. The valve-seat 32 opens into an enlarged part 33 of the plug, which opens the air-passage 34 of the stem which communicates with the air-compressor and with the mold by the side holes 34', Figs. 11 and 13. The plunger-valve stem is open at its lower end and projects a sufficient distance beyond the base-cup 23 for connection with the air-compressor and with a lever 35, by which the plunger-valve is actuated. The stem of the plunger-valve fits closely the walls of the bore of the cup 23, but is free to slide therein, and its outer end terminates in a collar by which it is clamped within and between the screw-couplings 39 41, and it is the coupling part 39 which forms the connection for the lever which reciprocates the plunger-valve which rotates with the mold, the friction of the valve-stem in the bore of the tubular plug 23 and stuffing-box being sufficient to cause such rotation or allow the tubular plug and the mold to be rotated independently of the air-tube. The extent of the movement of the plunger-valve is limited by the vibration of the lever caused by the deflection in the cam-groove, and as each mold has identical lever connections the cam-groove actuates both levers as the beam is rotated to cause the valve of one mold to be closed and the valve of the other mold to be opened, while the molds are standing as in Fig. 1. The air-compressor connection is made by a rubber tube 36, and in order that such connection will permit of the rotation of the plunger-valve 28 with the mold the rubber-tube connection with the stem of the plunger-valve is made by a ball-and-socket joint. As seen in Figs. 1, 2, and 11, this joint connection is made by the ball-stem 37, fastened to the rubber tube and inclosed in a coupling-nut 38, which is screwed on a screw-section 39, which has a concave seat 40 and is coupled to the plunger-valve by a screw-ring 41, making a seat-joining. The coupling-nut 38 is hollow and is adjustable to give more or less pressure upon the ball-stem. A stuffing-box 42 seals the plunger-valve stem 28 with the base-supporting plug 23, so that the rubber tube allows the plunger-stem to have a longitudinal movement to open and close its valve and for a limited projection into the neck of the mold and a rotary motion with the mold. A spring 43 maintains the sealed contact of the ball-and-socket joint, said spring being seated in the coupling-nut and against the ball-stem 37 for pressing the latter against the valve-stem 34 by the coupling 39.

Referring to Figs. 2, 11, and 12, it must be understood that the tubular valve-stem 28, the tubular plug 23, and the mold are the parts which are rotated together upon the ball-bearings, because they are clamped together upon the seating-gear cup by the shoulder 25' and the ring-nut 24, while the tubular stem 37 forms the non-rotating part, which connects with the air-compressor and affords a free bearing-joint and a free passage for the air in blowing the article. It is important to note that the air-tube, with its blow-hole-forming plug, does not rotate, neither does the article being blown rotate, because its neck having been first blown into the cavity of the tubular plug and into the neck-forming part of the mold, which is seated upon and is fixed thereto, are therefore rotatable together as an entirety and carry the article being blown with them. This construction allows the blow-hole-forming plug 30 of the air-tube to remain within and rotate with the ball of glass and the mold until the mold has started upon its swing movement, after which the air-tube plug is withdrawn, so as to uncover the blow-hole. The means for opening and closing the plunger-valve is a cam-groove 44 in the side of the fixed master-gear 4 and a lever 35, pivoted to the end of the mold-bearing beam and engaging the outer end of the plunger-valve by a suitable coupling. This lever travels in the groove 44 with the rotation of the beam, so that a deflection 45 in the groove acts to vibrate the lever, and thereby force the plunger inward and outward to project its solid inner point into and out of the neck of the mold for the two purposes of cutting off the air and forming the initial blow-hole in the lump of glass as a preparatory step in blowing the bottle, Figs. 3 to 13. For this purpose the lever has a clutch connection 39 with the plunger-valve, whereby it is free to rotate with the mold. The neck of the bottle is blown by an air-bolt projected through the bottom of the mold, which during such operation stands inverted, and the provision for effecting this blowing consists of a pivoted swing-valved device which is in communication with air under high compression and is manipulated by the attendant. This valved device, as shown, consists of an arm 46, mounted to swing horizontally on a rod 47, secured to the standard, and a spring-sustained arm 48, pivoted to the end of the swing-arm, so as to have a vertical movement on said pivot and having a valve and an independent air-supply connection therefor. This pivoted arm has a tube 49, standing transversely open at both ends, and a tubular valve 50, seated therein, adapted to close the upper end of the tube 49, which has communication with the storage-tank 84 above the valve. This tubular valve 50 terminates at its lower end in a conical formation 51 and is adapted to be opened by contact-pressure applied to its conical end when seated as a stopper in the open end of the tubular mold-cap 55, so as to lift the closed end 52 of the tubular valve from its seat. This opening movement of the valve 50 is slight and is limited by a shoulder 53, abutting against the lower end of the arm-tube 49, which permits the arm 48 to be held down under slight pressure to seal its communication with the mold-tube when applied thereto. For this purpose the mold is provided with a stem-valve 54, fitted in a tubular base 55, which is seated and clamped upon the bottom of the mold, so as to open centrally into the mold, and within the outer open end of which tubular base the tubular conical end 51 of the air-inlet valve 50 is caused to enter to effect communication of the air-storage tank 84 with the mold, as in Fig. 3. This mold-valve 54 closes the bottom of the mold tubular base by a spring 56, the tension of which need only be sufficient to keep the valve normally closed and is opened by the pressure of an incoming air-bolt on a perforated button 57, fitting the tube on the outer end of the valve-stem. This tubular base 55 is clamped upon the mold by a split ring 58, like that shown in Fig. 10, while the meeting faces of the tubular base 55 and of the mold are such as to interlock them with a sealed joint, which secures the base against the internal air-pressure in blowing the bottle, as in Fig. 2. The connection of the swing-arm valve 50 with the air-storage tank 84 is made by a rubber tube 59, connected to a branch 59' of the tubular seating 49 for the valve 50, so that the arm 46 can be swung horizontally into position to be joined with the mold-valve and then depressed vertically to effect such junction by the open end of the valve 50 making contact with the mold-tube 55. The valve-carrying arm is held normally horizontal by a spring 60 on the swing-arm 46 engaging an extension 48' of the pivoted arm 48 between the said pivot and the mounting-rod 47 of the swing-arm, so that the arm 48 is depressed against the tension of the spring and raised when released from pressure by said spring. To limit the downward-pressing action of the spring upon the valve-carrying arm 48 and to hold it in position to instantly set its nozzle or stopper end 51 upon and in communication with the open end of the mold tubular cap 55, the inner end of the swing-arm is pressed by the spring 60 upon a lug 77, fixed on the swing-arm 46, as in Fig. 1. To properly set the arm 46 so that its horizontal swing will carry the valve-arm 48 above and clear the open end of the tubular cap, the swing-arm is provided with a split clamp 78, by which it may be set higher or lower on the vertical stem 47 to suit different sizes of molds 79. In making this adjustment the table-stop 66 must also be adjusted to limit the swing movement of the molds, so that while one mold is resting on the table the other mold will be clear of the overhanging swing-arm valve, as in Fig. 1. By this construction the limiting of the downward swing of the mold in which the article is being blown will limit the upward swing of the other mold in its relation to the valve swing-arm. Whatever, therefore, the length of the mold, the table and the swing-arm can be relatively set to suit such length to render it easy to place the pivoted valved arm in communication with the mold tubular cap. The high-pressure valve is fitted closely in the tubular seat, with its upper end forming a solid valve-head 52, closing the seat. The valve-seat opens into a chamber 90, closed by the screw-cap which connects the flexible tube 59 with the storage air-tank, so that air therein under full pressure is in constant communication with the valve-chamber and keeps the valve closed by such pressure. The communication of this chamber 90 with the tubular passage of the valve is by holes 91 at the junction of the valve-head with the tubular stem, and the valve is opened by lifting it against the pressure of the air in the storage-tank, and when so lifted uncovers the wall-holes, and the air from the valve-chamber passes into and through the tubular valve, thereby opening the mold-valve, and is projected upon and drives the charge into the desired shape. The provision for this high air-pressure—say about five hundred pounds—not only gives greater volume, but much greater force than the provision for blowing the article, the air force for which should be a gradually-increased pressure and not have undue force to blow the charge into too-thin walls. Therefore the degree of air compression in the piston-compressors is less than that in the storage-tank. Moreover, the control of the air in both these blowing operations renders it only necessary to charge the mold to depress the high-pressure-air device to form a junction with the mold-valve and to finish the article while on its way to the point for removal. It is important to note that the mounting for the swing-arm 46 and the mounting of the mold must be such that the swing movement of the mold will bring it to a point of rest with its axis in vertical alinement with the axis of the high-pressure tubular air-valved connection and that the fulcrum of the valved lever-arm must be so located as to allow its tubular valved part to be depressed in a line coincident with the axial line of the mold. Convenient means for effecting the rotation of the shaft consists of a tiller-wheel 61, mounted on one of the standards, carrying a pinion 62, which engages a gear 63 on the end of the said shaft, whereby the mold-carrying beam is rotated intermittently through an arc of half a revolution, at which position it is stopped and seated to allow one of the molds to be filled and the other to be removed for the removal of the blown bottle and the replacement of the mold in the continuous operation of the machine, as I shall more particularly hereinafter state. The rotation of the mold-carrying beam is utilized as means for effecting the rotation of the mold on its axis while the bottle is being blown, and for this purpose the master-gear 4 is loosely mounted on the shaft adjacent to the mold-carrying beam and fixed to the frame, so that it cannot turn, by a bracket 64, fastened to the gear and to the standard, as in Fig. 4. Engaging this master-gear is a pinion 65 on the end of a short shaft 66, mounted in the end of the beam, so as to stand radially with the main shaft, and has a bevel-pinion 67, which engages the bevel-gear 22 on the end of the mold-supporting cup, whereby in rotating the mold-carrying beam the pinion 65 carried by it is caused to roll over the fixed master bevel-gear and be rotated thereby to cause the rotation of the mold during the half-revolution through which its carrying-beam is swung, so that the starting of the swing movement thereby starts the axial rotation of the mold. I have stated that the mold-carrying beam has an intermittent rotary motion in the operation of blowing and delivering a blown bottle, and, referring to Fig. 1, it will be seen that the mold at one end of the beam is in its rotation arrested by a table standing horizontally in the path of the mold. This table consists, preferably, of two shelf parts 68, each mounted to be swung horizontally on a bearing-screw stem 69, fixed vertically on the standards, so that when closed their meeting faces join, Fig. 9, and form a stop to the rotation of the beam and a table on which to support the tubular valved base 55 when unclamped, and the mold 19 freed thereby to be separated for removal therefrom to open it to remove the bottle. These shelf parts are made adjustable by nuts 70 on the screw-threaded bearing-stems 69 to allow different lengths of molds to be worked for different-sized bottles. The swing-arm that carries the high-pressure air-valve is also adjustable, so that it can be raised or lowered to accommodate different lengths of molds, and as the rotating beam travels the same distance at all times the handles of the molds will stand in the same place in front of the attendant at the table. Referring to Fig. 1, the beam has been swung to carry one of the molds to the table for the removal of the blown article and the other mold in position to receive the charge. To remove the mold with its blown article, the split clamp 21 must be opened by its handles 80 to release its locking connection with the neck-forming plug 23 and with the neck-forming part of the mold. The split clamp 58 is also opened by its handles 80 to release the mold from the tubular base 55, which then rests upon the table. While thus unlocking the mold the beam is held down tight on the mold by the attendant pressing upon the treadle, which acts to lock the shaft by means of the ball-and-ratchet clutch connections 72 73, as seen in full lines in Fig. 14. The attendant then releases the treadle, and this end of the beam, being freed from the mold, will rise by reason of the weight of the mold being charged, carrying the plug 23 away from the neck of the bottle, so that the mold can be drawn out sidewise by its handles 82 from between the tubular base 55, which remains on the table, and the neck-forming plug 23, which remains on the beam. This backward movement of the beam and shaft is limited by the screw-stop 81, set in the standard, and this movement is only sufficient to free the beam-plug 23 from the neck of the bottle, the treadle effecting such limit, as seen by dotted lines in Fig. 14. The mold having been replaced upon and locked to the tubular base part 55, the attendant again depresses the treadle, turning the shaft forward to bring the beam-plug 23 down upon the mold, which having been locked to the beam-plug the treadle is released and is normally held out of engagement in the position shown by dotted lines in Fig. 14 with the shaft-clutch by the spring 90, attached to the standard and bearing upon the treadle-arm, forcing it in its normal position against the stop. The tables are then opened and the beam rotated to carry the replaced mold to the position to be charged in the continuous operation of the machine. In the action of the clutch it will be understood that the treadle hangs loose upon the beam-shaft, allowing the latter to rotate freely forward, that the ratchet 73 is fixed on the shaft, and that the balls 72 are caused to engage the ratchet-teeth and the treadle-sleeve hub when the treadle is pressed down to turn its clutch-sleeve hub in the direction of the arrow, Fig. 5. In arresting the intermittent swinging rotation of the mold upon the table the axial rotation of the mold is thereby stopped. The tubular neck part of the valved base passes through the hole 83, Fig. 9, formed for it between the meeting edges of the swing-table parts. The treadle in its holding function on the beam to allow the mold to be removed therefrom also serves to support the mold at the other end of the beam against the downward pressure of the high-pressure air-lever device upon the mold. It will also be noted that the molds are arranged to stand in opposite directions and substantially at right angles to the beam, so that when one mold is in inverted position to receive the charge the other mold will stand upright at the other end of the beam in position to be opened for the removal of the blown bottle. This arrangement is advantageous as affording a balance to the beam, as each has identical construction of mold and air-compressor connections and identical gear connections with a central fixed master-gear, whereby each mold is caused to be rotated on its axis. In operation the mold-carrying beam is stopped and maintained in a horizontal position for charging one of its molds and removing from its other mold the blown bottle, and, referring to Fig. 1, it will be seen that the mold being charged is in an inverted position, while the other mold has been carried over to its table-support on the other side of the machine, with its neck-forming part standing up. In this position the tubular valved bottom part 55 of the inverted mold is removed and a charge of molten glass from a punty dropped into the open mold upon the solid point 30 of the plunger-valve 28, as shown in dotted lines, and the tubular valved part replaced and locked. This position of the beam brings its cam-groove-actuated lever 35 in the deflected part 45 of the groove 44, so as to lift and hold the plunger-valve, with its solid point, at the limit of its inward movement into the plug 23, closing it at the end of the neck-forming cavity, which gives sufficient space around the plunger-point to form the bottle-neck. The high-air-pressure valved lever 48 is then swung over the mold and pressed down, bringing its nozzle 51 under pressure closely seated as a stopper upon the upper open end of the tubular base-valve part 55, which pressure causes the lever-valve 50 to be lifted, thereby opening communication with the high-pressure air supply or storage tank 84, the air-bolt from which instantly depresses and opens the stem-valve 54 and allows the air to be projected with a blow into the mold, striking and driving the molten glass down over the point 30 of the plunger-valve, so as to form in the glass an initial blow-hole, at the same time forming the neck of the bottle, as in Figs. 3 to 13. This is but a moment's work, and the valve-lever is then swung to one side and the tiller-wheel rotated, carrying the mold over and seating it upon the table. This half-circle swing brings the empty mold to the position from which the charged mold started, while at the starting of this swing movement the plunger-valve 28 is withdrawn by the action of the cam-groove 45 upon the lever 35, which connects the stem of said valve, and thereby opens the passage to the mold for the entrance of air into the initial blow-hole. It is during this half-circle swing of the mold that the bottle is blown, and the air for this purpose is furnished by the air-compressor, the piston of which is caused by the action of the fixed eccentric to be forced inward, driving the air out under a gradually-increased pressure through the rubber tube 36 and through the plunger-valve into the blow-hole of the charge of the glass, expanding and forming the bottle around the walls of the mold, as in Fig. 2. The fixed eccentric while thus forcing the piston into the compressor as the mold is traveling through the half-circle is at the same time and to the same extent withdrawing the other piston from the other compressor, so that when one mold reaches the position to receive the glass charge the piston of its air-compressor is at the limit of its outward stroke drawing in air and the piston of the other compressor is at the limit of its inward stroke, having forced out the air, the bottle is blown, and the mold seated upon the table to be removed from the beam. In this way the operation is made continuous, the mold-carrying beam being rotated vertically and the fixed eccentric causing the alternate projection and retraction of the pistons at each revolution of said beam. This relation of the pistons and their relation to the fixed eccentric are seen in Fig. 6, the projection of the eccentric to one side of its shaft being in the line of the piston-rods, and therefore both pistons are at the limit of their strokes when the beam stands horizontal. In this figure is seen how the fixed eccentric has forced the independent strap of each piston-rod to project one piston and retract the other, and this result is obtained by having independent piston connections on one and the same eccentric.

It is important to regulate the pressure of air forced from the compressor to suit different sizes of bottles, and for this purpose I make provision for adjusting the eccentric upon the standard so as to increase or diminish the extent of the projection of the eccentric at one side of the shaft. To allow for this adjustment of the eccentric, it is secured to the standard by a bracket 74, as seen in Figs. 4 and 6, and the adjustment is made by nutted bolts 75, which pass through arms in the bracket and through slots 76, standing horizontal in the eccentric on each side of the shaft, as in Fig. 8. The eccentric also has a horizontal slot 6, which permits it to be set over the shaft 2, which passes through it, and the eccentric is therefore independent of the shaft. In setting the eccentric for this purpose it is only necessary to loosen the bolts 75 and move the eccentric thereon to either side of the shaft to give the eccentric more or less projection on one side thereof. The greater this projection the longer will be the strokes of the pistons, and necessarily an increased pressure of air will be forced from the compressors, and vice versa. In the blowing operation it is necessary that the mold shall be rotated on its axis to give uniform thickness to the walls of the bottle while the mold is being swung upward and over and down to its seating on the table. In these two movements of the mold the blowing is first in an upward direction into the neck of the bottle and terminates in a downward direction, and it is these two axial and swing movements coacting that give a uniform thickness to the walls of the bottle by counteracting the tendency of the glass to gather on one side of the mold from the force of the swing movement. This swing movement, it will be observed, is rendered comparatively slow by the provision of the tiller-wheel and its pinion engaging a larger gear on the shaft, which rotates and carries the mold-carrying beam, while the rotation of the mold on its axis is rapid, because the master-gear wheel drives the small bevel-wheels 65 and 67, the latter of which engages with the gear 22 of the cup on which the mold is clamped and which is supported by the ball-bearings.

As the intermittent swinging rotation of the pair of molds is to render the operation continuous in blowing the article in one mold while the other is being presented to receive the charge of glass, such continuous operation would produce an imperfect article were it not for the provision for causing the glass to shape itself with uniform thickness within the mold-walls during its swinging movement by the axial rotation of the mold, both movements being uninterrupted from start to finish. In the coöperation of these two movements the starting of the swinging movement of the mold automatically sets in motion its axial rotation, while the arrest of the swinging movement of the mold automatically causes the stopping of its axial rotation, the swing movement being comparatively slow to allow the glass to shape itself around the walls of the mold. The mold operation in this way causes the article to be blown at one and the same operation, in which three forces coact continuously—that is, a blowing force under a gradually-increasing pressure, a centrifugal force due to the axial rotation of the mold, and a swinging movement thereof—each force having a separate and distinct function in the completion of the article. The result of the gradually-increasing pressure of the air is to cause it to have a uniform force in expanding the glass as the latter is caused to fill the mold.

In my process the embodiment in an operation of one step of three forces acting as a unit is the confining of air injected under a gradually-increasing pressure into a charge of molten glass, while at the same time the charge is subjected to two continuous simultaneous movements, whereby the air is caused to be directed and to have a central action within the charge, whereby that side of the glass wall which stands toward the direction of the swing movement will be prevented from being blown into a thin wall or away to nothing.

The holding of the air centrally in the ball of glass is the important function of the operation of blowing, rotating, and swinging the mold, and in the art of blowing glass I believe myself to be the first to employ these three forces in their coöperating functions.

I have stated that the article is blown under a gradually-increasing air-pressure, and I mean by this that the capacity of the air-compressor is first determined according to the size of the bottle to be blown to give the proper volume of air for blowing it, then treating this limited volume of air by compressing it with a gradually-increasing pressure, so that as the pressure increases the glass expands to take it up, the volume of air being thereby neither increased nor diminished.

At the moment of the commencement of the overswing of the mold the piston of its air-compressor commences to force air into the mold to blow and expand the glass around its walls and the air-pressure is gradually increased to cause the glass to be uniformly expanded against the walls of the rotating mold until the mold is seated upon the table. Meanwhile the piston returning by the underswing is being retracted, drawing in air until it reaches the point from which the other mold started, and is therefore ready for its blowing function in starting the mold in its overswing movement. In this way the rotation of the mold-carrying beam is controlled by hand by turning the tiller-wheel, which at the same time and by the same movement controls the movements of the air-compressing pistons. It is important also to note that the air-compressor is in perpetual communication with the tubular plunger-valve and that such communication with the mold is controlled by the plunger-valve at the point where the neck of the bottle is formed. It is also important to note that the operation of blowing the bottle is commenced while the mold is in an inverted position and is finished during a movement in which the mold is swung over through an arc of half a circle, while the empty mold is by the same swing brought to the position to receive a charge of glass to repeat the operation. It is only necessary to give the tiller-wheel a few turns to effect the blowing of the bottle during the swing of the mold through half a revolution, and the mold is delivered with its blown bottle with an easy stop upon a table. The sectional mold, its clamps, and the pivoted table-forming parts are each provided with handles, by which they are opened and closed, as seen in Fig. 1. In forming the blow-hole in the charge the importance of such a hole lies in being uncovered after being formed for the purpose of freely admitting the air therein independent of the plug-valve, which is withdrawn to uncover the neck and hole for this purpose. This construction permits the point of the plunger-valve to be made solid instead of being perforated, as hitherto used, and in which use the blow-hole cannot be uncovered as an initial step in the blowing and expansion of the glass. The air-storage tank 84 may be conveniently placed near the swing-arm and kept under high pressure from a pump (not shown) by a suitable valved connection 85. While it is important that the valve which controls the high-pressure air should be opened suddenly to admit air in large volume and under high force to drive the molten glass solidly into the form of the mold, it is equally important that the valve which controls the blowing of the hollow article should be opened and closed slowly to gradually admit and cut off the air, because high air force under sudden projection is not suited to blowing glass into thin walls. For this reason the ends of the deflected part of the cam-groove are inclined to give a gradual vibration to the lever 35 in passing from the part of the groove which holds the valve closed into the part of the groove which holds the valve open, as seen in Fig. 1. In this way the rotation of the beam causes the plunger-valve of the mold moving to the position to receive the charge to be opened and the plunger-valve of the other mold to be opened to effect the blowing of the article while the mold is under a compound movement of being rotated on its axis and swung to the position at which the mold is removed for the removal of the blown article.

Referring to the separate and distinct air-pressures, and particularly to the importance of providing different pressures for the two separate blowing operations, it will be seen that the rotation of the mold-carrying beam as a means of actuating the air-compressors serves to create the air-pressure at the time it is needed for blowing the article and by a graduated increasing pressure, and this graduated pressure is produced as follows: As the mold starts on its swing after the neck has been blown the plunger-valve is opened by the action of the cam-groove upon the valve-connected arm. The air then enters the blow-hole in the formed neck at a very low pressure, because the eccentric will then be working off the dead-center part. As the beam progresses in its swing the eccentric increases the speed of the air-compressing piston, and therefore increases the pressure for the blowing. The action of the eccentric is such that the air for blowing is gradually increased in pressure, because if the air were let into the mold from a tank of uniform high pressure the glass would be splattered or puffed out in a blister and the centrifugal action on the glass, due to the axial rotation of the mold, would be without effect.

I do not claim herein the described and illustrated invention in apparatus either as to its construction or as to its combinations, since claims to the subject-matter thereof are made the subject of a separate and distinct application for a patent filed by me of even date herewith, the present invention being directed solely to a novel method of blowing glassware, and for which the organized machine illustrated is well adapted.

I claim—

1. The process herein described for forming glass articles which consists of an operation of one step having three forces acting as a unit, viz: injecting air under a gradually-increasing pressure within a charge of molten glass while at the same time subjecting the charge to two continuous simultaneous movements, one swinging the other rotating or centrifugal one at right angles to the other whereby the gradually-increasing air-pressure is caused to be directed and to have a central action within the charge to prevent that side of the glass wall which stands toward the direction of the swing movement from being blown too thin or away to nothing.

2. The process herein described for forming glass articles which consists in blowing air under a gradually-increasing pressure into a charge of molten glass and holding the pressure of the air central within the charge by imparting thereto a simultaneous swinging and rotating movement for the purpose stated.

3. The process for forming necked glass articles which consists in confining a charge of molten glass, projecting under high compression a sudden bolt of air upon one side of the confined charge to drive a portion of it into the form of a neck and to form therein a blow-hole, then shutting off the air-bolt, then uncovering the blow-hole and completing the article by blowing air therein under a gradually-increasing pressure while it is under a compound movement of swinging and rotating.

4. The process herein described for forming glass articles which consists in expanding a confined charge of molten glass into the completed form by injecting air under a gradually-increasing pressure into the charge and at the same time subjecting it to a high rotation and to a slow swinging movement while the article is being completed.

In testimony whereof I affix my signature in presence of two witnesses.

HARRY SEMPLE.

Witnesses:
A. E. H. JOHNSON,
LULU P. STROUD.